Nov. 25, 1958          R. C. NORRIE          2,861,797
FRONT END SPRING SUSPENSION FOR HEAVY-DUTY TRUCKS
Filed Feb. 1, 1957          3 Sheets-Sheet 3
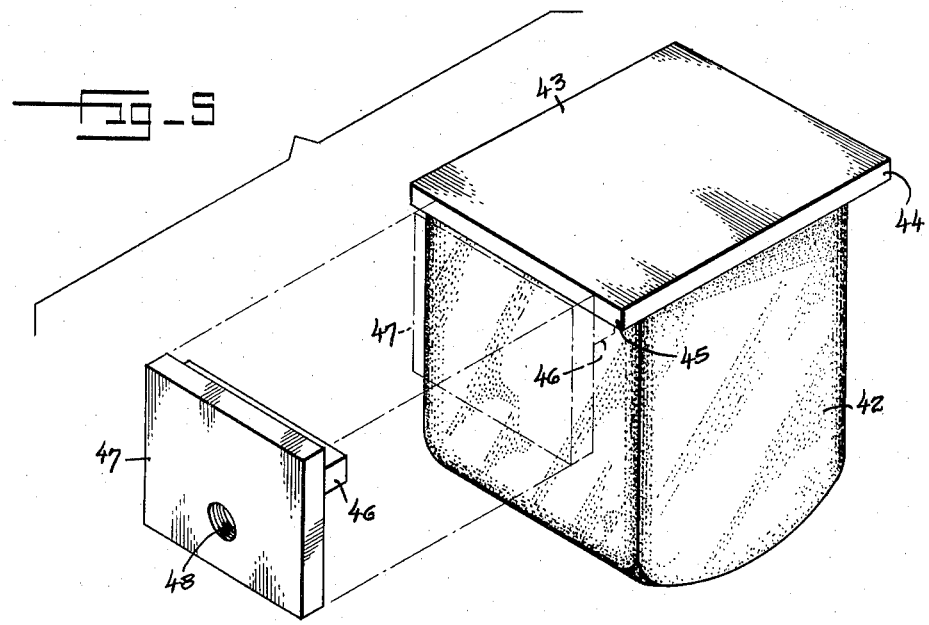
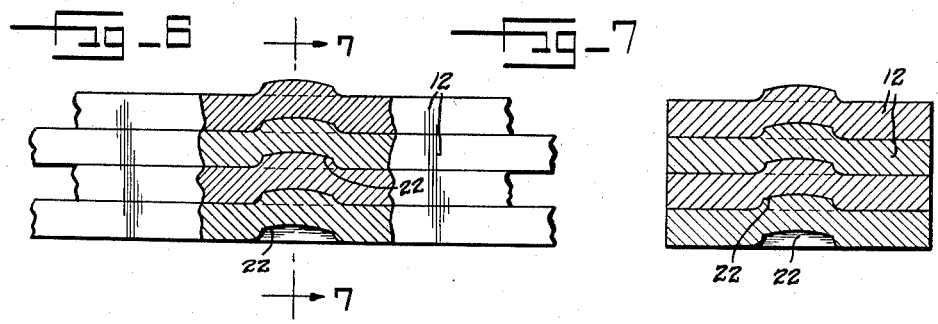
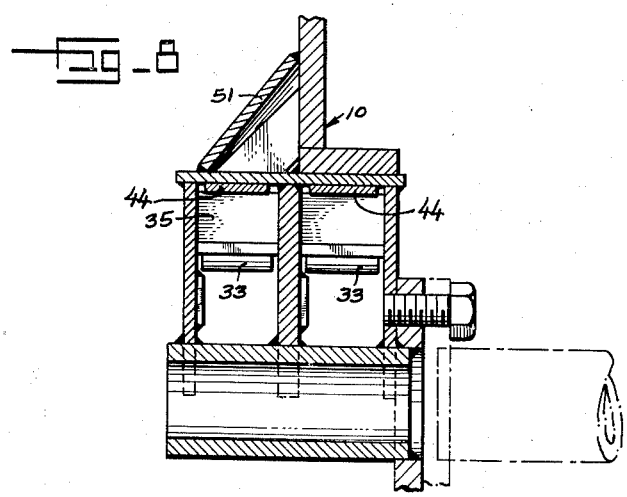
INVENTOR.
Robert C. Norrie
BY
Attorneys

United States Patent Office 2,861,797
Patented Nov. 25, 1958

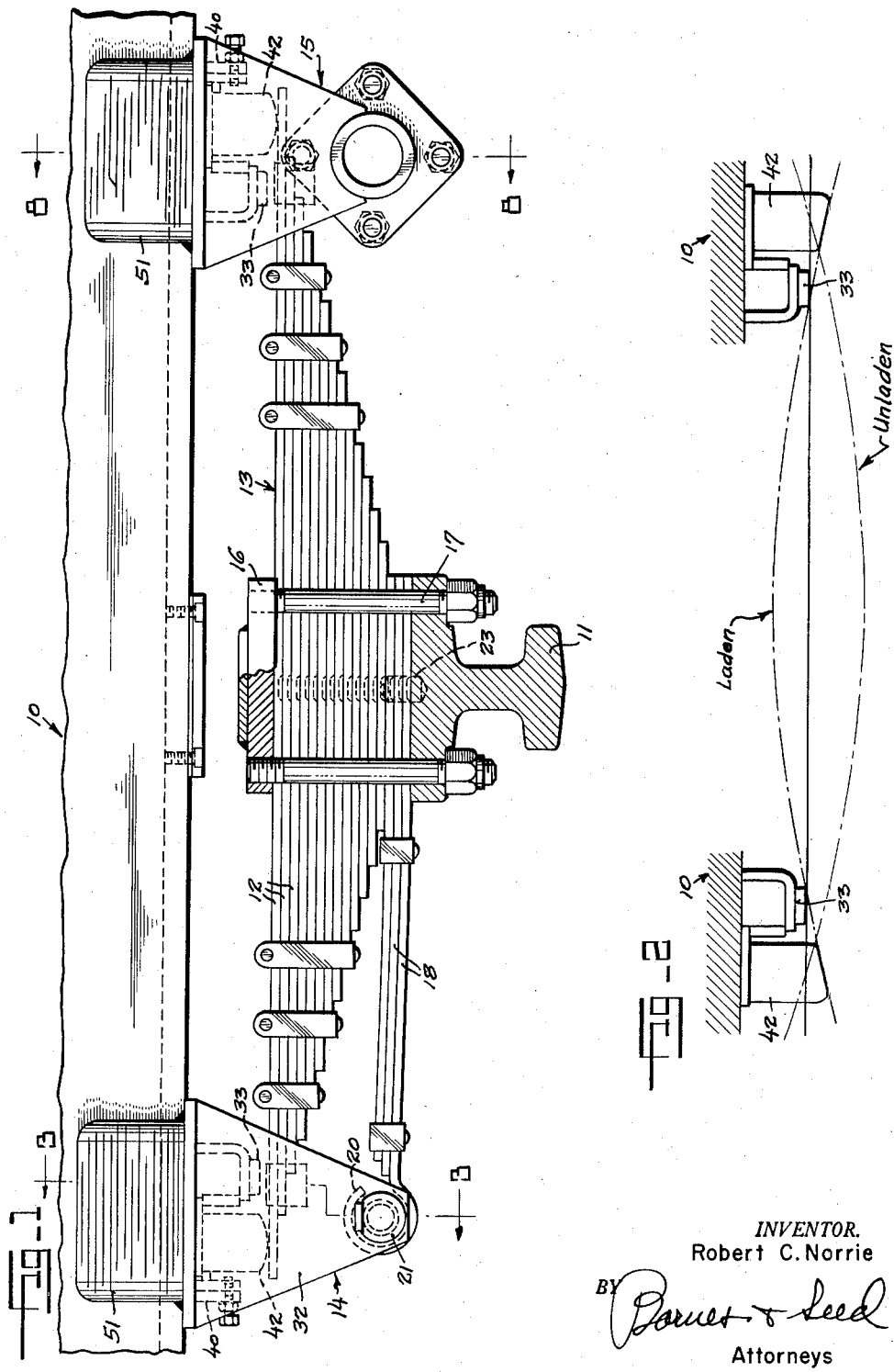

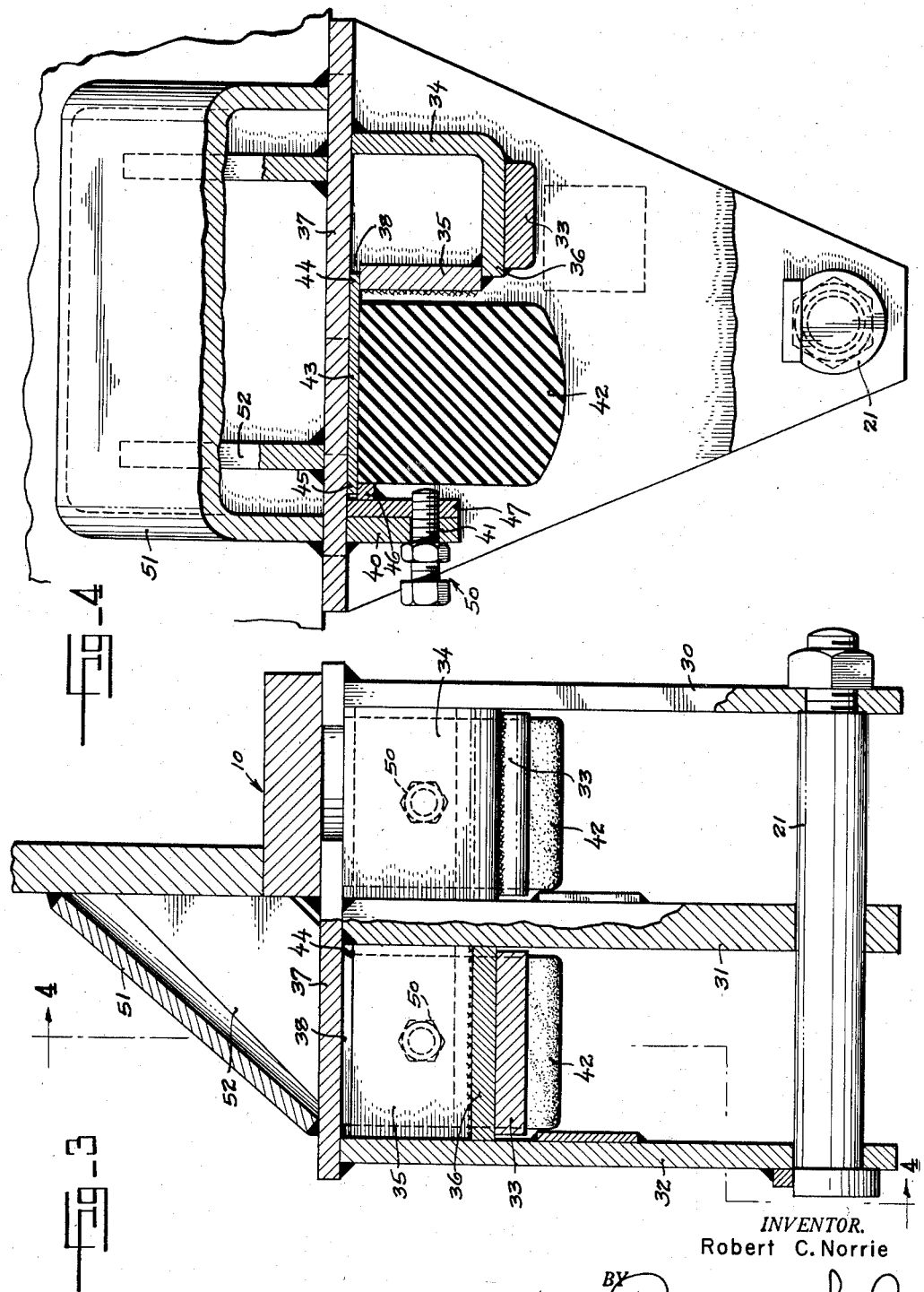

2,861,797

FRONT END SPRING SUSPENSION FOR HEAVY-DUTY TRUCKS

Robert C. Norrie, Seattle, Wash., assignor to Pacific Car and Foundry Company, a corporation of Washington Application February 1, 1957, Serial No. 637,824

10 Claims. (Cl. 267—30)

This invention relates to a suspension for springing a vehicle frame from an axle, and particularly a front end suspension for trucks and other like land vehicles such as earthmovers which are subjected to comparatively heavy loading.

The suspension system is one employing multiple spring leaves bound in a pile, and it will be readily seen, with a vehicle of the nature here under consideration, namely one in which the change in loading on the front axle between the laden sprung weight and the unladen sprung weight approaches or even exceeds 40%, that ordinary leaf springing which would provide an acceptable riding condition in the full laden chassis would produce an extremely stiff ride when the chassis is laden.

Normally referred to as a 2-stage system, the present suspension is of that nature employing semi-elliptic spring leaves, and having for each end of each spring stack an inner and an outer supporting bearing point. The two outer bearing points contact the spring at its extreme length, reflecting an unladen sprung weight and producing maximum flexibility for this riding condition, while the inner pair of bearing points come into contact when the spring is fully deflected under maximum load.

For its general object the invention purposes to perfect a spring suspension of the described 2-stage nature.

The invention has the further and particular object of providing a 2-stage suspension system in which the outer said bearing points are of rubber block construction designed for a specified deflection under load.

With the above and still more particular objects and advantages in view and which will each appear and be understood in the course of the following description and claims, the invention consists in the novel construction and in the adaptation and combination of parts hereinafter described and claimed.

In the accompanying drawings:

Figure 1 is a side elevational view portraying a vehicle frame sprung from an axle-beam by a suspension system constructed to embody the preferred teachings of the present invention, the frame being shown fragmentarily and the axle being shown in longitudinal vertical section.

Fig. 2 is a schematic view thereof showing the spring stack under light and heavy extremes of loading, and namely (1) when the chassis is unladen so that the contact between spring and bearing points is at the extreme ends of the spring, and (2) when the chassis is fully laden so as to fully deflect the spring and reduce the effective length with the outer pair of bearing points then becoming inactive and the spring taking its seat against the inner pair of bearing points.

Fig. 3 is a transverse vertical sectional view drawn to an enlarged scale on line 3—3 of Fig. 1.

Fig. 4 is a longitudinal vertical sectional view on line 4—4 of Fig. 3.

Fig. 5 is an exploded perspective view detailing the replaceable rubber pad which forms the outer seat for the spring stack, together with the keeper which acts to retain the rubber pad in position.

Fig. 6 is an enlarged-scale fragmentary longitudinal vertical sectional view of several component leaves of the spring stack to detail the conventional inter-nested cupping of the same.

Fig. 7 is a transverse vertical sectional view on line 7—7 of Fig. 6; and

Fig. 8 is a transverse vertical sectional view on line 8—8 of Fig. 1.

Designated by the numeral 10 in said drawings is one of two fabricated channel members employed as longitudinal frame principals. The front axle-beam is denoted by 11, and received between such axle and the frame principals so as to spring such frame from the axle are cantilever type springs comprised of sets of spring leaves 12 bound in stacks 13. Slipper brackets 14 and 15, which will be hereinafter particularly described, provide frame mountings for the front and rear ends, respectively, of each said stack, and at the stack's midlength the same finds a seat upon the axle, being clamped thereto by surmounting pads 16 secured by bolts 17. In the preferred embodiment two such spring stacks are provided at each side of the vehicle, arranged side-by-side. As is usual with cantilever-type spring stacks in which both end mountings comprise slipper brackets, radius arms are provided which connect with one such bracket to hold the axle against shifting in a direction normal to its length, or which is to say longitudinally of the vehicle, such radius arms comprising leaves 18 bound into the stack at the bottom of the latter. Upon the free end of one of such leaves 18 there is provided a hook, as 20, which engages a pin 21 extending transversely of the related slipper bracket. The several leaves of the spring stack including the associated leaves of the radius arm are cupped, as at 22, so as to inter-nest, each upper leaf with the next lower leaf, and for localizing the stack in relation to the axle there is provided a dowel 23 which fits in registering sockets formed in the leaves 18 and in the axle.

Proceeding now to describe the slipper mountings 14 and 15, it will be seen from an inspection of Figs. 3 and 8 that each such bracket presents a pair of stalls defined by a center wall 31, an inside wall 30, and an outside wall 32. The inboard stack of each pair of bound spring leaves has its two ends received in the stalls defined between the walls 30 and 31, while the outboard stack of each pair of springs has its ends received in the stalls which are defined between the walls 31 and 32. These said stalls, four in all for each side of the vehicle, are functionally alike insofar as the present invention is concerned, and a description of the one will suffice for the others.

Each stall presents two longitudinally spaced apart bearing points, or seats as they will be hereinafter termed, and I will refer to these seats as inner and outer seats, using these terms in the sense of their relative proximity to the axle.

Of these seats the inner seat comprises a steel plate 33 welded to the underside of a box. The box is welded in turn to the slipper bracket to become an integral part thereof, extending as a spanner from one to the other side wall of the stall and being a fabricated structure presenting front and back walls 34 and 35, respectively, and a bottom wall 36. The back wall 35 terminates short of the head wall 37 of the bracket to define an interstice 38 therebetween.

Spaced rearwardly from said back wall and, like the latter, welded as a spanner between the side walls of the stall is a vertical wall 40 having a hole 41 drilled therethrough. In the pocket defined between this wall 40 and the back wall 35 there is received a pad or block 42 composed by preferance of tread rubber—55–60 durometer—and vulcanized to the head of such rubber block is a plate 43 projecting both fore and aft beyond the related wall of the block. This plate, in thickness, is moderately less than the vertical width of the interstice 38 so that the forwardly extending lip 44 of said plate 43 will fit therein. The rearwardly extending lip 45 of the plate is arranged to lodge upon a ledge 46 presented by a retainer 47, such retainer having a tapped opening 48 registering with the hole 41 and receiving a screw-and-nut assembly 50 for locking the retainer in place. It will be apparent that the rubber block can be readily replaced by withdrawing the clamp screw, dropping the retainer, and then backing off the block to free the lip 44 from its engagement in the interstice 38. The length of the rubber block is such that the same projects in a moderate degree below the steel plate 33.

Considering the operation, it will be apparent that the spring beam's sole contact with the slipper bracket, when the vehicle is in an unladen condition, is the rear seat comprised of the rubber block 42. Designed for a specified deflection under load, the predetermined deflection of such block added to the predetermined amount of the spring beam's deflection represents the total suspension deflection of the unladen vehicle and is a measure of the riding qualities of the suspension in terms of its natural period of vibration in cycles per minute.

As payload is apppplied to the chassis the spring-and-rubber combination further deflects to a point where the steel inner bearing point comes into action, at which time the effective length of the spring beam is substantially reduced. The rubber bearing point now becomes inactive and the laden vehicle's riding qualities perforce become a function of the spring deflection and the spring length.

It will be apparent that the system is basically a variable rate spring suspension system with the addition of rubber in compression to produce the desired softer riding qualities in the unladen condition of the chassis. As weight loading of the vehicle takes place the responsive deflection of the spring beam makes the suspension basically an ordinary cantilever system with two points of support.

It will be seen that the mounting brackets are substantially wider than the frame channels 10, with the head plate 37 being prolonged outwardly well beyond the channel. Gussets 52 and a strut 51 are introduced in the produced angle. Welding is preferably employed to secure the bracket and said stiffening pieces one to the other and to the channel.

It is thought that the invention will have been clearly understood from the foregoing detailed description of my now-preferred embodiment. Changes in the details of construction will suggest themselves and I accordingly intend that no limitations be implied and that the hereto annexed claims be given the broadest interpretation which the employed language fairly permits.

What I claim is:

1. In a suspension mechanism for springing the frame of a vehicle from an axle and employing for each side of the vehicle as the primary springing agent a longitudinally disposed spring beam, the combination with said frame, the axle, and the spring beam, means for anchoring the center portion of the spring beam to the axle, and respective frame-carried stalls for each end of the spring beam, said stalls having an inverted U-shape when viewed from the end and each presenting two longitudinally spaced apart bearing points the outer of which bears upon the spring end when the vehicle is in an unladen condition and the inner of which bears upon the spring end when the vehicle is in a fully laden condition, the inner said bearing point being substantially incompressible while the outer point comprises a block of rubber moderately deflectible under stress of compression loading, the stall providing a pocket loosely confining the rubber block so that the block can expand under stress of compression loading, block-holding means being provided acting independently of the spring end to releasably localize the block of rubber within the stall.

2. A spring suspension for each side of a vehicle comprising, in combination with a vehicle frame, and an axle spaced below said frame, an inboard and an outboard spring beam disposed side-by-side in the space between said frame and axle, and each anchored by its center portion to the axle, and frame-carried slipper brackets one for the front ends of the two spring beams and the other for the rear ends of the two spring beams and comprising, in each instance, inside and outside walls spaced at opposite sides of a center wall and each depending from a common head wall so as to define two identical stalls each having an inverted U-shape when viewed from the end and functioning one to receive the end of the inboard spring beam and the other to receive the end of the outboard spring beam, each of said slipper brackets presenting at the front a box body extending as an integral spanner from one to the other side wall of the stall and bearing upon the spring end when the vehicle is in a laden condition and at the rear presenting a pocket receiving a compressible block of rubber bearing upon the spring end when the vehicle is in an unladen condition.

3. Structure according to claim 2 in which the vehicle frame provides a longitudinal channel at each side of the vehicle, and wherein said head wall of each related bracket is welded to the channel in underlying relation thereto and has a substantial portion projecting laterally well beyond a side edge of the channel, and having a strut welded to the channel and to the projecting portion of the head wall in the angle therebetween.

4. Structure according to claim 2, said block of rubber being vulcanized to the underside of a plate providing projecting lips at the front and rear and having an overall length moderately less than the length of the pocket, the front wall of the pocket terminating short of the head wall of the pocket to produce an interstice into which the front lip of said plate fits, and a retainer for said rubber block removably secured in the pocket between the rubber block and the pocket's rear wall in a position sustaining the rear lip of the plate.

5. A slipper bracket for the end of a spring beam in a two-stage spring suspension of the nature described, comprising inside and outside walls depending from a head wall so as to define a stall for the reception of the spring end, said stall having an inverted U-shape when viewed from the end, adjacent its front end having a box body extending as an integral spanner between said inside and outside walls and bearing upon the spring end when the spring beam is in a loaded condition, and spaced to the rear of the rear wall of said box body having a back wall also extending as an integral spanner between the inside and outside walls of the stall, said back wall together with said rear wall of the box body defining an open-bottom pocket, a compressible block of rubber received in said pocket to bear upon the spring end when the spring beam is in an unladen condition, said block of rubber being vulcanized to the underside of a plate, and means releasably engaging said plate to removably secure the rubber block in the pocket.

6. The structure recited in claim 5 in which the box body has a steel wear plate welded to the underside.

7. Structure as recited in claim 5, the plate to which said block of rubber is vulcanized providing lip prolongations projecting fore and aft and having an overall length less than the pocket, the rear wall of the box body terminating short of the head wall of the pocket to produce an interstice into which the fore lip of said plate fits, and a retainer for said rubber block removably secured in the pocket between the back wall and the rubber block in a position sustaining the aft lip of the plate.

8. Structure according to claim 7, said retainer having a tapped opening registering with an opening provided in said back wall, the removable connection comprising a bolt fitted with a lock nut and with the bolt being received through said hole and threading into the tapped opening.

9. A slipper bracket for the end of a spring beam in a two-stage spring suspension of the nature described comprising inside and outside walls depending from a head wall so as to define a stall for the reception of the spring end having an inverted U-shape when viewed from the end, said stall having at its front end a bearing point bearing upon the spring end when the spring beam is in a loaded condition, and spaced to the rear of said bearing point having an open-bottom pocket defined between two walls which extend transversely as integral spanners between the inside and outside walls of the stall, a compressible block of rubber received in said pocket to bear upon the spring end when the spring beam is in an unladen condition, said block of rubber being vulcanized to the underside of a plate, and means releasably engaging said plate to removably secure the rubber block in the pocket.

10. Structure according to claim 9, the plate to which said block of rubber is vulcanized providing lip prolongations projecting fore and aft beyond the rubber and having an overall length less than the length of the pocket, the pocket's front wall terminating short of the head wall of the pocket to produce an interstice into which the fore lip of said plate fits, and a retainer for said rubber block removably secured in the pocket between the back wall and the rubber block in a position sustaining the aft lip of the plate.

References Cited in the file of this patent

UNITED STATES PATENTS

| | | |
|---|---|---|
| 1,617,031 | Schacht | Feb. 8, 1927 |
| 1,722,426 | Kampfer | July 30, 1929 |
| 2,054,305 | Stilwell | Sept. 15, 1936 |
| 2,065,094 | Reinoehl et al. | Dec. 22, 1936 |
| 2,295,084 | Keehn | Sept. 8, 1942 |
| 2,691,519 | Bennett et al. | Oct. 12, 1954 |
| 2,693,354 | Walter et al. | Nov. 2, 1954 |
| 2,741,491 | Van Raden | Apr. 10, 1956 |